United States Patent [19]

Holland

[11] 4,344,702
[45] Aug. 17, 1982

[54] ADAPTER FOR PHOTOGRAPHIC ENLARGER AND METHOD OF ATTACHING SAME

[76] Inventor: Robert M. Holland, P.O. Box 12364, Wichita, Kans. 67277

[21] Appl. No.: 183,249

[22] Filed: Sep. 2, 1980

[51] Int. Cl.³ .................. G03B 27/54; G03B 27/32
[52] U.S. Cl. ..................... 355/67; 355/37; 355/71; 355/77; 362/17
[58] Field of Search ............ 355/21, 32, 37, 67, 355/70, 71, 77; 362/11, 13, 17, 457

[56] References Cited

U.S. PATENT DOCUMENTS

| | | | |
|---|---|---|---|
| 3,684,371 | 8/1972 | Weisglass et al. | 355/37 |
| 3,716,298 | 2/1973 | Reardon | 362/17 |
| 3,907,427 | 9/1975 | Tschink | 355/67 |
| 3,927,941 | 12/1975 | Yamaguchi | 355/71 |

FOREIGN PATENT DOCUMENTS 1176469  8/1964  Fed. Rep. of Germany ........ 355/67

*Primary Examiner*—Richard A. Wintercorn
*Attorney, Agent, or Firm*—John H. Widdowson

[57] ABSTRACT

An adapter and process for fitting an Omega C-700 color head to an Omega D type condenser enlarger. The adapter includes a circular plate member having a flange along its periphery, a generally rectangular aperture and a circular recess, and an L-shaped bracket.

7 Claims, 8 Drawing Figures

ADAPTER FOR PHOTOGRAPHIC ENLARGER AND METHOD OF ATTACHING SAME

BACKGROUND OF THE INVENTION

1. Field of the Invention

This invention relates to a photographic enlarger. More specifically, this invention provides an adapter for a photographic enlarger.

2. Description of the Prior Art

D Type condenser enlargers have been made since 1945, and there are maybe upwards of 200,000 of them in use. U.S. Pat. No. 3,907,427 by Tschink and U.S. Pat. No. 3,927,941 by Yamaguchi do not teach or suggest the adapter of this invention which applies to persons desiring to equip their Omega D type black and white enlargers to receive and mount an Omega C-700 color head. A complete color enlarger costs many times what it costs to adapt the D type to color enlarge.

SUMMARY OF THE INVENTION

This invention accomplishes its desired objects by providing an adapter and process for fitting an Omega C-700 color head to an Omega D type black and white condenser-enlarger comprising a circular plate member with a top and a bottom and having a recess with a recess wall along its circumference such that the periphery of the top of the plate defines a flange. The plate member includes a structure defining a generally rectangular aperture and a substantially circular recess in the bottom. A generally L-shaped bracket member, including a face and a base, has its base mounted on top of the plate in proximity to the periphery. In the process, the adapter is attached to the color head; the upper lamphouse of the enlarger is removed; and subsequently, the connected adapter-color head is installed on the enlarger.

It is an object of the invention to provide an adapter for a photographic enlarger.

Still further objects of the invention reside in the provision of an adapter and process for fitting an Omega C-700 color head to an Omega D type black and white condenser-enlarger.

These together with the various ancillary objects and features will become apparent as the following description proceeds, are attained by this adapter, a preferred embodiment being shown in the accompanying drawings, by way of example only, wherein:

DETAILED DESCRIPTION OF THE INVENTION

Figure 1:
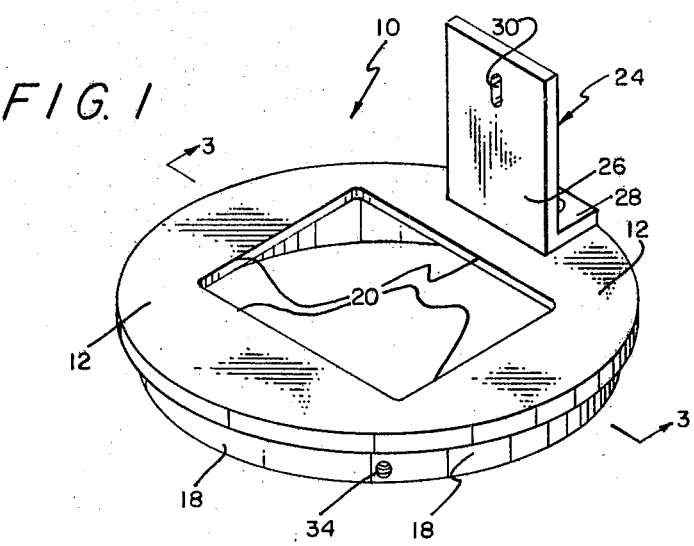
FIG. 1 is a perspective view of the adapter.
Figure 2:
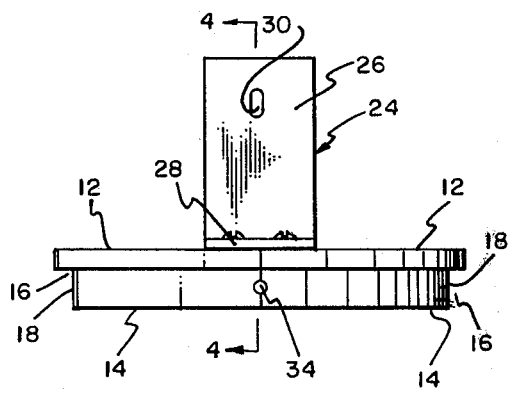
FIG. 2 is a front elevational view of the adapter.

Referring in detail now to the drawings, wherein like reference numerals designate similar parts throughout the various views, there is seen an adapter, generally illustrated as 10, comprising a top 12 and a bottom 14, and a recess 16 with a recess wall 18 such that the periphery of the top 12 of the adapter 10 defines a flange. Top 12 has a rectangular aperture 20 and the bottom includes a circular recess 22.

A generally L-shaped bracket, generally illustrated as 24, having a face 26 and a base 28, is mounted on top 12 by its base 28 such that face 26 is in proximity to the rectangular aperture 20 and the base 28 is essentially registering with the periphery of the top 12. The face 26 of bracket 24 has an elongated opening 30.

Figure 5:
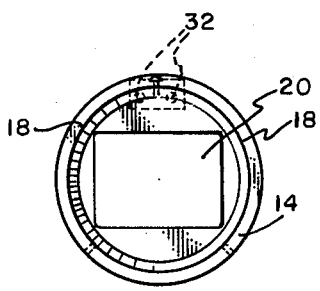
FIG. 5 is a bottom plan view of the adapter.
Figure 3:
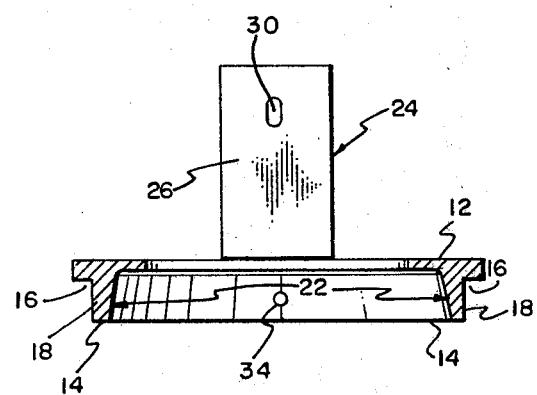
FIG. 3 is a vertical sectional view of the adapter taken along the plane of line 3—3 in FIG. 1.
Figure 4:
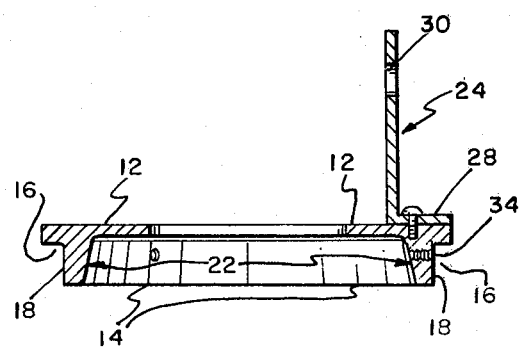
FIG. 4 is a vertical sectional view of the adpater taken along the plane of line 4—4 in FIG. 2.

The bottom 14 of the adapter 10 has a pair of cylindrical recesses 32-32 (see FIG. 5) situated underneath the bracket 24. The recess wall 18 has three threaded apertures 34 positioned therearound, extending through into the circular recess 22. They are positioned and drilled to match mating parts.

Figure 6:
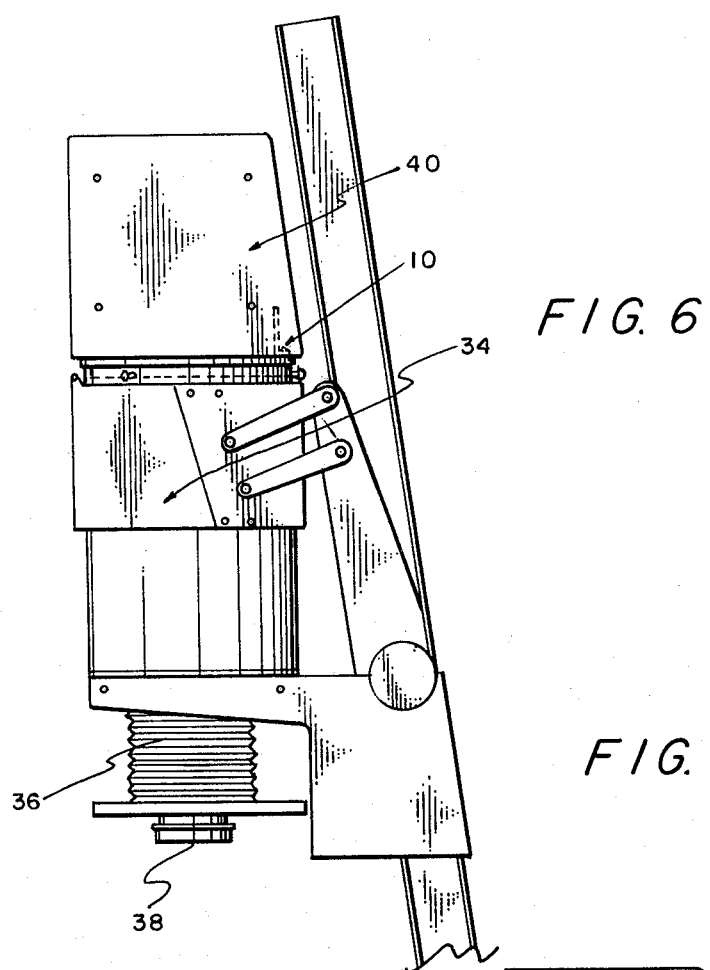
FIG. 6 is a side elevational view of the adapter illustrated in dotted lines mounting a color head to a variable enlarger.
Figure 7:
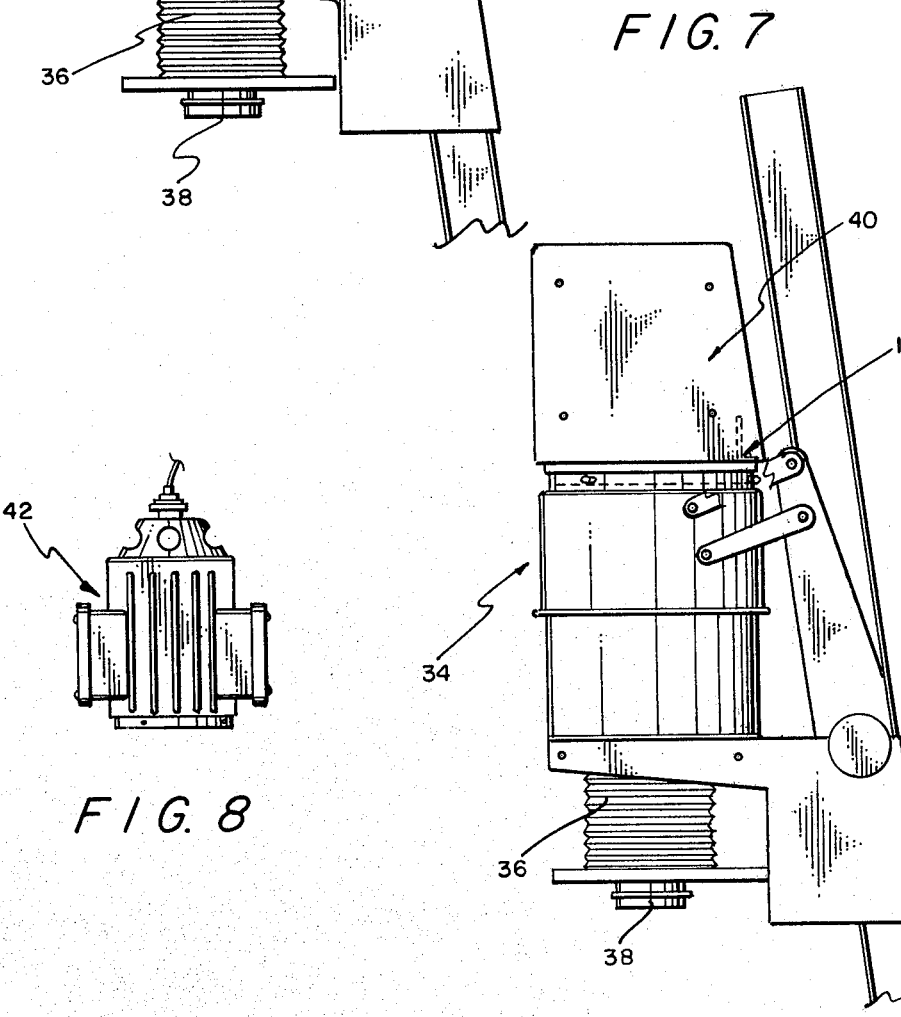
FIG. 7 is a side elevational view of the adapter illustrated in dotted lines mounting a color head to a non-variable enlarger.
Figure 8:
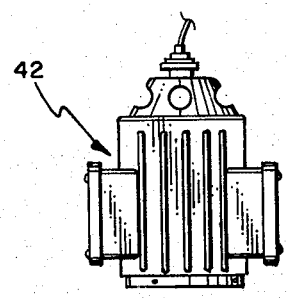
FIG. 8 is a view of the lamphouse of the enlarger.

With continuing reference to the drawings (particularly FIGS. 5, 6 and 7) for operation of the invention wherein the adapter 10 is utilized for equipping an Omega D type black and white enlarger, generally illustrated as 34 (including bellows 36 carrying on its lower part an enlarger lens 38), to receive and mount an Omega C-700 color head, generally illustrated as 40.

The upper lamphouse (see FIG. 7), generally illustrated as 42, is removed from the enlarger 34, and the adapter 10 is attached to the color head 40. Subsequently, the attached adapter 10—color head 40 is installed on the enlarger 34 (see dotted line figure of adapter 10 in FIGS. 5 and 6). The adapter 10 invention applies to persons desiring to equip an Omega D type black and white enlarger 34 (well known to those in the art) to receive and mount an Omega C-700 color head 40 (also well known to those skilled in the art).

While the present invention has been described herein with reference to a particular embodiment thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. An adapter for fitting an Omega C-700 color head to an Omega D type black and white condenser-enlarger comprising a circular plate member with a top and bottom and having a recess with a recess wall along its circumference such that the periphery of the top of said plate defines a flange, said plate member including a structure defining a generally rectangular aperture and a substantially circular recess in said bottom; and a generally L-shaped bracket member including a face and a base, said base of said bracket member being mounted on top of said plate in proximity to said periphery.

2. The adapter of claim 1 wherein said face of said bracket member is in proximity to said rectangular aperture and comprises a structure defining an elongated opening.

3. The adapter of claim 2 wherein said bottom of said plate additionally comprises a pair of cylindrical recesses.

4. The adapter of claim 3 wherein said pair of cylindrical recesses is situated in said bottom underneath said bracket member.

5. The adapter of claim 4 wherein the walls of the recess comprises a plurality of threaded apertures extending through into the circular recess for attaching said plate to said black and white enlarger.

6. The adapter of claim 5 wherein said plurality of threaded apertures includes three apertures positioned along said recess wall from each other.

7. A process for equipping an Omega D type black and white enlarger having an upper lamphouse to receive and mount an Omega C-700 color head comprising:

(a) attaching an adapter to said color head, said adapter comprising a circular plate member with a top and a bottom and having a recess with a recess wall along its circumference such that the periphery of the top of said plate defines a flange, said plate member including a structure defining a generally rectangular aperture and a substantially circular recess in said bottom, and a generally L-shaped bracket member including a face and a base, said base of said bracket member being mounted on top of said plate in proximity to said periphery;

(b) removing said upper lamphouse of said enlarger and subsequently, (c) installing on said enlarger said attached adapter-color head of step (a).

* * * * *